United States Patent
Wasserman et al.

(10) Patent No.: US 6,874,161 B1
(45) Date of Patent: Mar. 29, 2005

(54) UTILIZING A HIGH BANDWIDTH COMMUNICATIONS CHANNEL FOR BROADCASTING NETWORK DATA DURING OFF-PEAK HOURS

(75) Inventors: Steven Wasserman, Mountain View, CA (US); Stephen G. Perlman, Mountain View, CA (US)

(73) Assignee: WebTV Networks, Inc., Mountain View, CA (US)

( * ) Notice: Subject to any disclaimer, the term of this patent is extended or adjusted under 35 U.S.C. 154(b) by 0 days.

(21) Appl. No.: 09/107,267

(22) Filed: Jun. 30, 1998

(51) Int. Cl.[7] .......................... H04N 7/173; H04N 7/00; H04N 7/14
(52) U.S. Cl. .................. 725/95; 725/100; 709/219; 370/235
(58) Field of Search .................. 709/217; 348/12, 348/13, 10, 6, 906, 726; 455/3.1, 5.1, 3.2, 4.2, 6.1, 6.2, 6.3; 370/229, 233, 235, 237; 725/86, 87, 93, 95, 100, 131, 139, 115; H04N 7/00, 7/14, 7/173

(56) References Cited

U.S. PATENT DOCUMENTS

| | | | | |
|---|---|---|---|---|
| 5,134,464 A | * | 7/1992 | Basile et al. ................ | 348/487 |
| 5,440,336 A | * | 8/1995 | Buhro et al. ................. | 348/13 |
| 5,589,892 A | * | 12/1996 | Knee et al. ................. | 348/906 |
| 5,602,847 A | * | 2/1997 | Pagano et al. .............. | 370/484 |
| 5,612,742 A | * | 3/1997 | Krause et al. .............. | 348/385 |
| 5,636,247 A | * | 6/1997 | Kamerman et al. ......... | 348/388 |
| 5,657,072 A | * | 8/1997 | Aristides et al. ............. | 348/13 |
| 5,666,293 A | * | 9/1997 | Metz et al. ................. | 725/132 |
| 5,864,823 A | * | 1/1999 | Levitan ....................... | 705/14 |
| 6,005,561 A | * | 12/1999 | Hawkins et al. ............ | 345/327 |
| 6,031,577 A | * | 2/2000 | Ozkan et al. ............... | 348/906 |

* cited by examiner

Primary Examiner—Vivek Srivastava
(74) Attorney, Agent, or Firm—Workman Nydegger

(57) ABSTRACT

A method and apparatus for utilizing a high bandwidth communications channel for broadcasting network data during off-peak hours is disclosed. A demodulation unit includes, 1) a standard television broadcast signal receiver, the signal having a plurality of channels; 2) a partitioning unit configured to partition at least one channel of said plurality of channels into a plurality of variable size sub-channels; 3) a modulating unit configured to modulate a variety of different types of information into said plurality of sub-channels; and 4) a transmitter configured to transmit said plurality of sub-channels over a high bandwidth communications channel during off-peak hours.

35 Claims, 13 Drawing Sheets

UTILIZING A HIGH BANDWIDTH COMMUNICATIONS CHANNEL FOR BROADCASTING NETWORK DATA DURING OFF-PEAK HOURS

FIELD OF THE INVENTION

The present invention relates to the field of networked computer systems. Specifically, the present invention relates to a method and apparatus for utilizing a high bandwidth communications channel for broadcasting network data during off-peak hours.

DESCRIPTION OF RELATED ART

With the advent of consumer-oriented services on global networks such as the Internet, there has been an explosion of interest in delivering these services to users in their homes. Private on-line services such as America On-line (AOL™), Internet Service Providers (ISPs) such as Netcom™, and television-based Internet services such as the WebTV™ Network from WebTV Networks, Inc. and Intercast® from Intel® Corporation, are all seeking to provide on-line services to typical consumers in their. homes.

Unfortunately, the world's residential communication infrastructure was not designed to accommodate the high-bandwidth, two-way requirements of on-line services. It is generally impractical in terms of cost for an individual home to be served with a high-bandwidth two-way communications line, such as a T1 or a T3 line. As such, "plain old telephone service" (POTS) and Integrated Services Digital Network (ISDN) services are the most common mode of home Internet access today. These Internet services are accessed by home users via standard POTS modems or ISDN modems. Although POTS modems are becoming increasingly more efficient in utilizing bandwidth, there is still a 64 Kbps limitation on the digitization of voice channels in the switched telephone network. ISDN, on the other hand, can provide approximately 128 Kbps in bandwidth in some countries. This 128 Kbps bandwidth, however, represents the reasonable upper limit in bandwidth for two-way communications using today's available infrastructure to homes.

Thus, the, present invention facilitates better and more efficient usage of network bandwidth.

SUMMARY OF THE INVENTION

A method and apparatus for utilizing a high bandwidth communications channel for broadcasting network data during off-peak hours is disclosed. A demodulation unit includes, 1) a standard television broadcast signal receiver, the signal having a plurality of channels; 2) a partitioning unit configured to partition at least one channel of said plurality of channels into a plurality of variable size sub-channels; 3) a modulating unit configured to modulate a variety of different types of information into said plurality of sub-channels; and 4) a transmitter configured to transmit said plurality of sub-channels over a high bandwidth communications channel during off-peak hours.

Other objects, features and advantages of the present invention will be apparent from the accompanying drawings and from the detailed description.

BRIEF DESCRIPTION OF THE DRAWINGS

The present invention is illustrated by way of example and not by way of limitation in the figures of the accompanying drawings in which like reference numerals refer to similar elements and in which.

DETAILED DESCRIPTION OF THE PREFERRED EMBODIMENT

The present invention is a method and apparatus for utilizing a high bandwidth communications channel for broadcasting network data during off-peak hours. In the following detailed description, numerous specific details are set forth in order to provide a thorough understanding of the present invention. It will be apparent to one of ordinary skill in the art that these specific details need not be used to practice the present invention. In other instances, well-known structures, interfaces, and processes have not been shown in detail in order not to unnecessarily obscure the present invention.

Figure 1A:
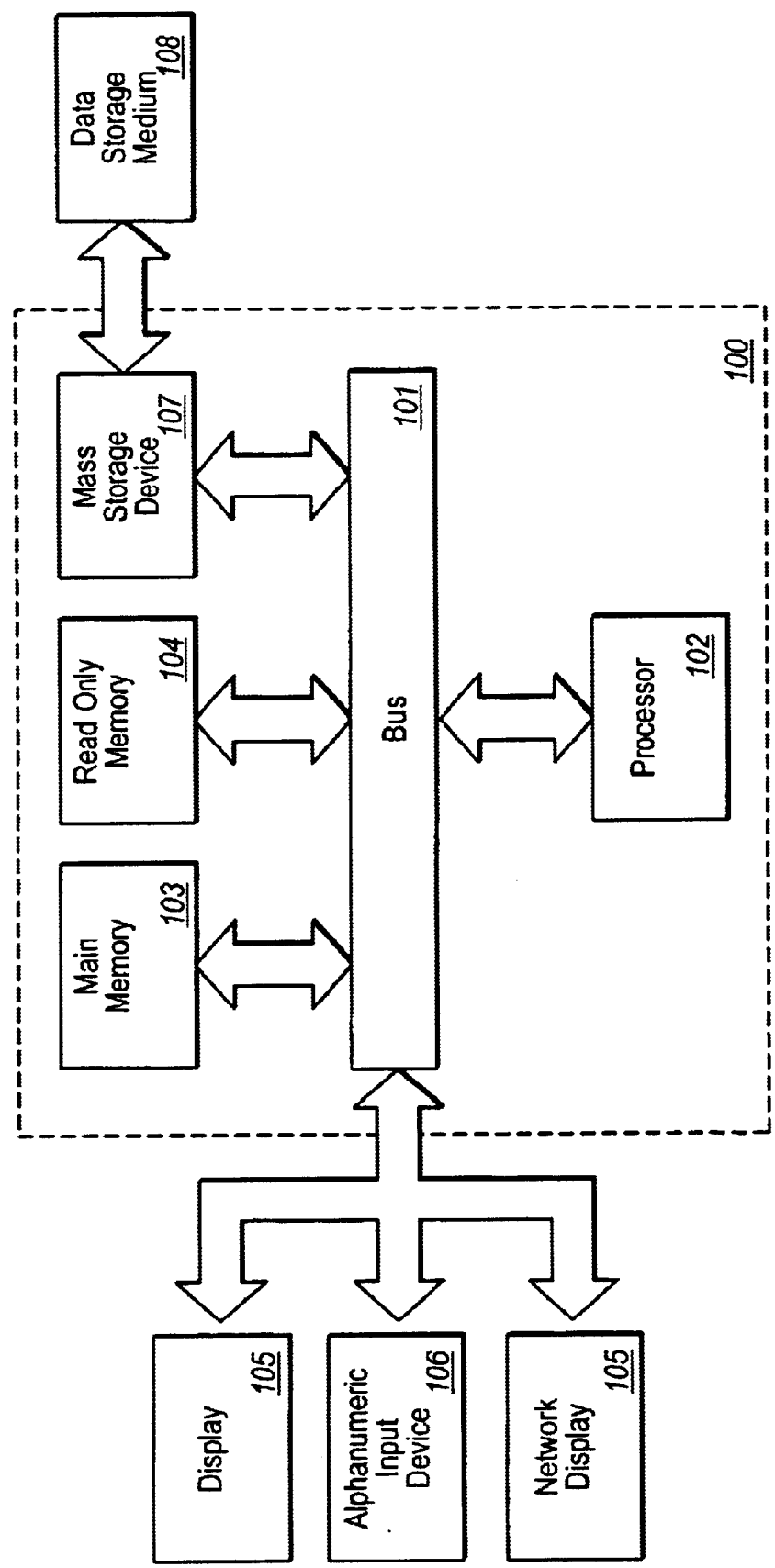
FIG. 1A is a typical computer system in which the present invention operates.

FIG. 1A illustrates a typical computer system 100 in which the present invention operates. One embodiment of the present invention is implemented on a personal computer architecture. It will be apparent to those of ordinary skill in the art that other alternative computer system architectures may also be employed.

In general, such computer systems as illustrated by FIG. 1A comprise a bus 101 for communicating information, a processor 102 coupled with the bus 101 for processing information, main memory 103 coupled with,the bus 101 for storing information and instructions for the processor 102, a read-only memory 104 coupled with the bus 101 for storing static information and instructions for the processor 102, a display device 105 coupled with the bus 101 for displaying information for a computer user, an input device 106 coupled with the bus 101 for communicating information and command selections to the processor 102, and a mass storage device 107, such as a magnetic disk and associated disk drive, coupled with the bus 101 for storing information and instructions. A data storage medium 108 containing digital information is configured to operate with mass storage device 107 to allow processor 102 access to the digital information on data storage medium 108 via bus 101.

Processor 102 may be any of a wide variety of general purpose processors or microprocessors such as the Pentium® microprocessor manufactured by Intel® Corporation. It will be apparent to those of ordinary skill in the art, however, that other varieties of processors may also be used in a particular computer system. Display device 105 may be a liquid crystal device, cathode ray tube (CRT), or other suitable display device. Mass storage device 107 may be a conventional hard disk drive, floppy disk drive, CD-ROM drive, or other magnetic or optical data storage device for reading and writing information stored on a hard disk, a floppy disk, a CD-ROM a magnetic tape, or other magnetic or optical data storage medium. Data storage medium 108 may be a hard disk, a floppy disk, a CD-ROM, a magnetic tape, or other magnetic or optical data storage medium.

In general, processor 102 retrieves processing instructions and data from a data storage medium 108 using mass storage device 107 and downloads this information into random access memory 103 for execution. Processor 102, then executes an instruction stream from random access memory 103 or read-only memory 104. Command selections and information input at input device 106 are used to direct the flow of instructions executed by processor 102. Equivalent input device 106 may also be a pointing device 'such as a conventional mouse or trackball device. The results of this processing execution are then displayed on display device 105.

Computer system 100 includes a network device 110 for connecting computer system 100 to a network. Network device 110 for connecting computer system 100 to the network includes Ethernet devices, phone jacks, satellite links, and/or other methods or devices for communicating with a network. It will be apparent to one of ordinary skill in the art that other network devices may also be utilized.

Another embodiment of the present invention is implemented on an Internet system such as the WEBTV™, brand Internet system developed by WebTV Networks™, Inc., of Palo Alto, Calif. The Internet system includes a standard television set as a display device for browsing the World Wide Web and connects to a conventional network, such as the Internet, using standard telephone, ISDN, or a similar network communication coupling. Further details of the Internet system, including the Internet system client can be found in U.S. Pat. No. 6,034,689, entitled, "Web Browser Allowing Navigation Between Hypertext Objects Using Remote Control,' filed on Jun. 3, 1996.

A user of a Internet client system can utilize Internet network services provided by one or more remote Internet servers. The Internet network services can be used in conjunction with software running in a Internet client system to browse the Web, send electronic mail, and to make use of the Internet in various other ways. The Internet network uses a HyperText Transport Protocol (HTTP) based set of protocols implemented within the Web and supported by one or more Web servers.

Figure 1B:
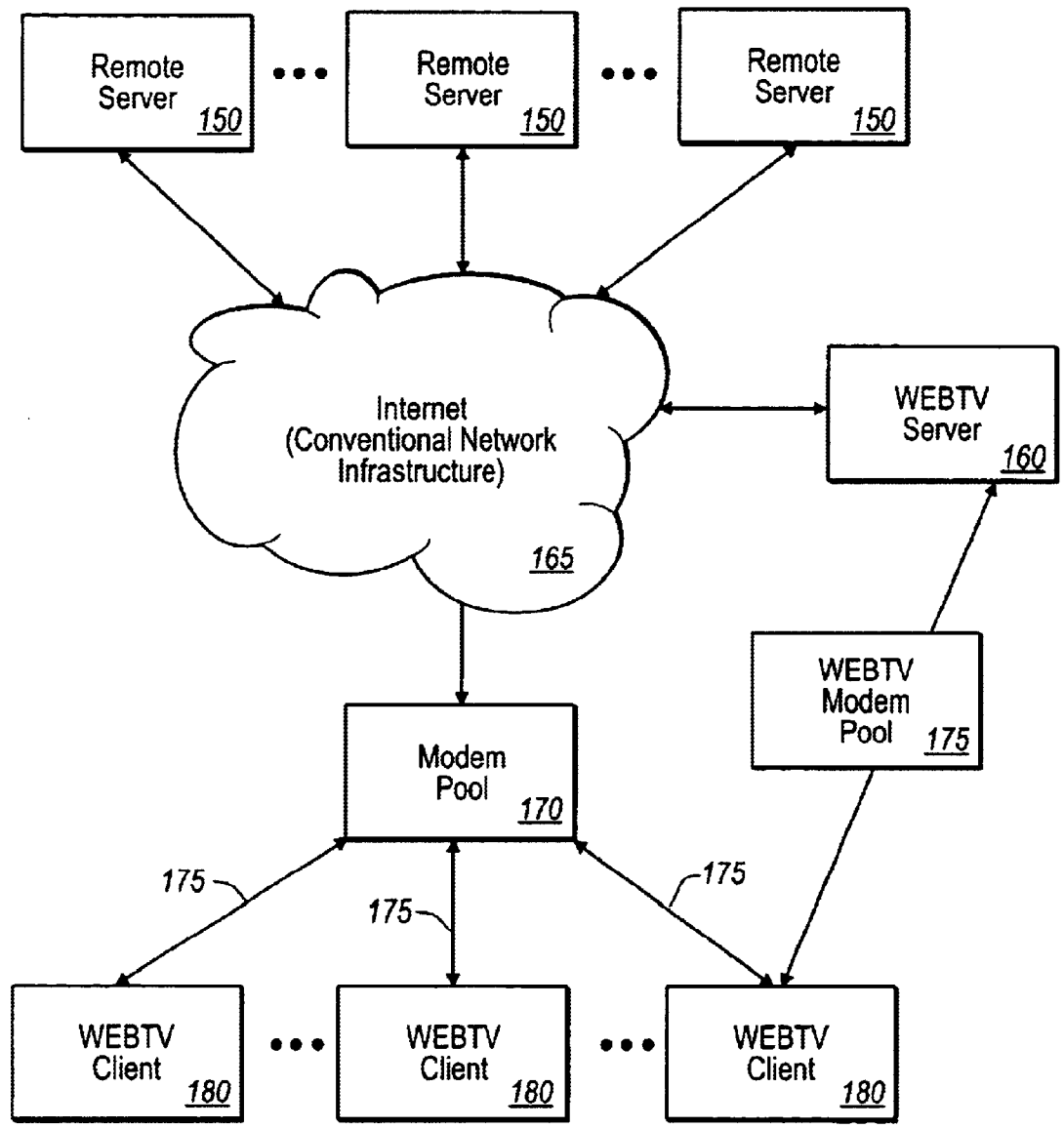
FIG. 1B is an alternate computer system in which the present invention operates.

FIG. 1B illustrates a basic configuration of the Internet network according to one embodiment. A number of Internet clients 180 are coupled to a modem pool 170 via direct-dial, bi-directional data connections 175, which may be telephone (POTS or ISDN), or any other similar type of connection. Modem pool 170 is coupled typically through a router, such as that conventionally known in the art, to a number of remote servers 150 via a conventional network infrastructure 165, such as the Internet.

The Internet system also includes a Internet server 160, which specifically supports the Internet clients 180. Internet server 160 acts as a proxy in providing the Internet client 180 with access to the Web and other Internet services. More specifically, Internet server 160 functions as a "caching proxy." A proxy cache on Internet server 160 is used for temporary storage of Web documents, images, and other information which is used by frequently either the Internet client 180 or the Internet server 160.

Internet clients 180 each have a connection to the Internet server 160 either directly, via a Internet modem pool 175, similar to modem pool 170, or through the conventional modem pool 170 and the Internet 165. Note that the modem pool 170 is a conventional modem pool, such as those found today throughout the world providing access to the Internet and private networks. Further details of the Internet system, including the Internet client can be found in the above-referenced co-pending U.S. patent application.

One embodiment of the present invention is implemented as a software module, which may be executed on a computer system such as computer system 100 or Internet server 160 in a conventional manner. Using well known techniques, the application software of the preferred embodiment is stored on data storage medium 108 and subsequently loaded into and executed within computer system 100 or Internet server 160. Once initiated, the software of this embodiment operates in the manner described below.

Figure 2A:
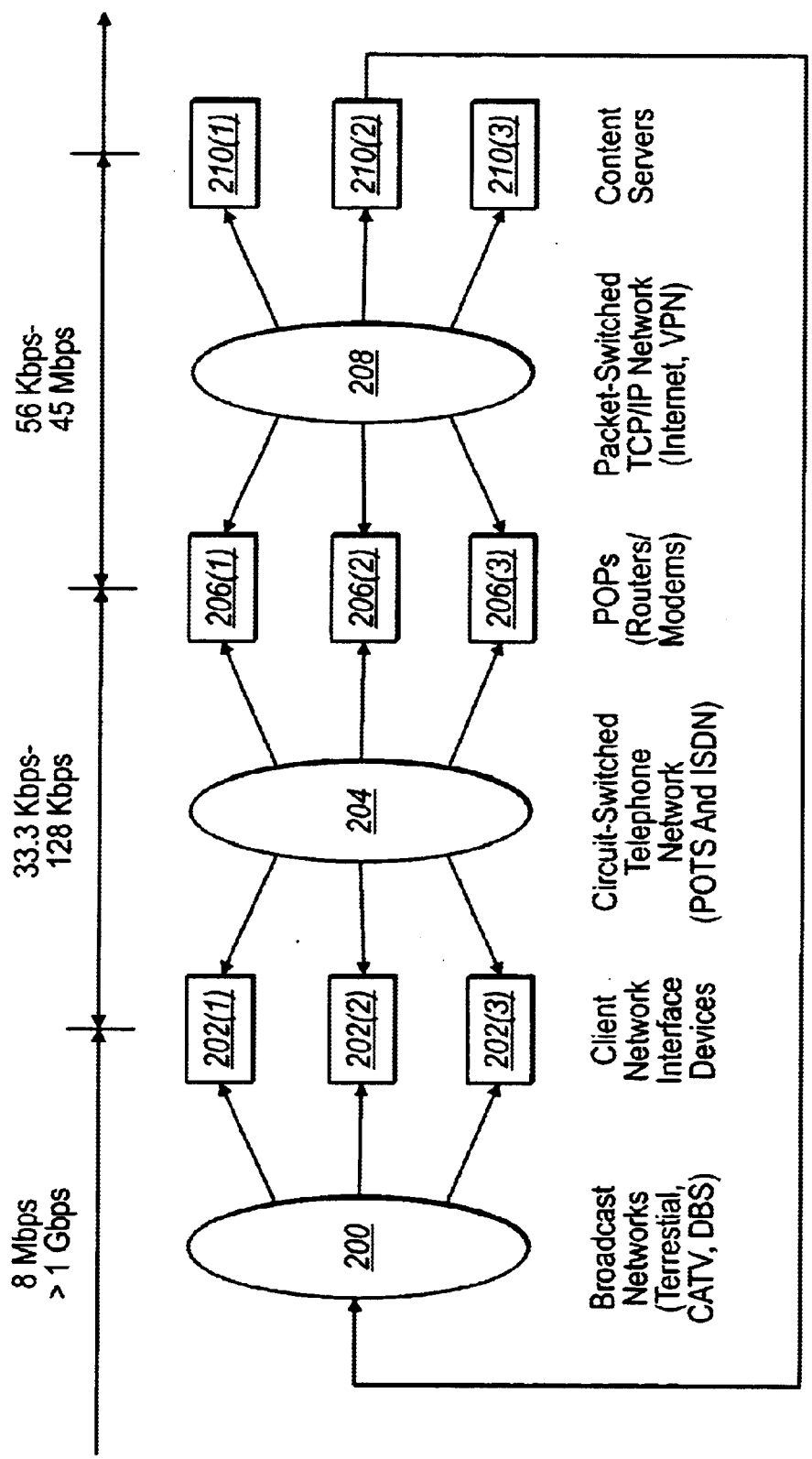
FIGS. 2A and 2B illustrate the currently available devices and services on the Internet.

FIG. 2A illustrates the variety of communications channels currently available to the typical home on-line service subscriber in an industrialized country such as the United States, Japan, or the United Kingdom. The arrows indicate the direction(s) of data flow over a given channel.

A user browsing the Internet today can select specific content such as web pages, video clips, audio clips or advertisements. This selected content is typically stored on servers on the Internet, identified in FIG. 2A as content server 210. Since these content servers are usually maintained at commercial locations, very high bandwidth communications channels such a T1 or T3 lines are available to connect them to either a TCP/IP network, such as the Internet or a Virtual Private Network (VPN), or other packet-switched networks, such as X.25. Content servers may also be connected to conventional broadcast channels including a cable television (CATV) channel, a terrestrial channel, or a Digital Broadcast Satellite (DBS) channel. Due to the nature of these conventional broadcast channels, however, they are typically limited to transmitting data in a single downstream direction, namely from the content server to the client.

Such content servers can be located at one site or at many sites throughout the world. In fact, it is quite possible to replicate such content servers in several locations so as to minimize the communications channel resources used by bringing a content server closer to each subscriber and to provide redundancy in the event of a server or communications failure.

Figure 2B:
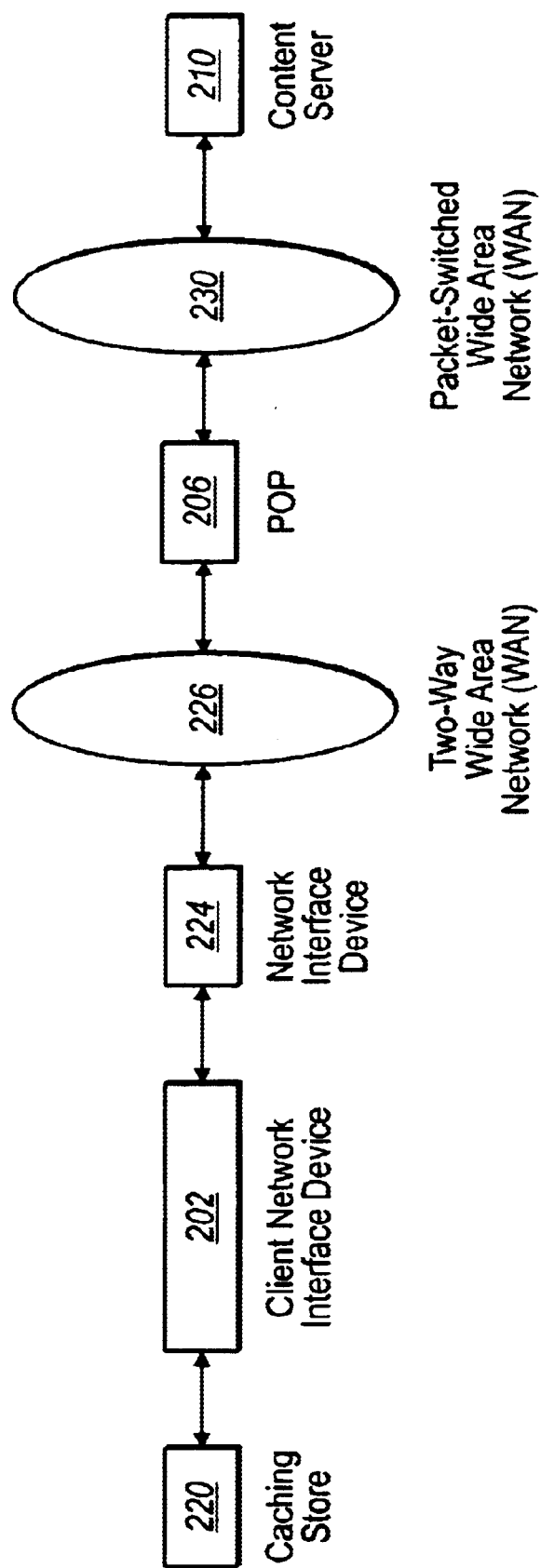

FIG. 2B illustrates a common configuration today for PCs and network-enabled set-top boxes and video game consoles. Client network interface device (client device) 202 may include a device such as a Internet set-top box, a video game system or a PC, that incorporates features described in computer system 100 above. Connected to client device 202 is a network interface device 224, such as a POTS modem, an ISDN adapter, a cable modem or an Asynchronous Digital Subscriber Loop (ADSL) modem. Also connected to client device 202 is caching store 220. Caching store 220 may include a hard disk, a digital video disk (DVD), flash Read-Only Memory (ROM), or Random Access Memory (RAM). Other client devices, network interface devices and caching stores may also be utilized.

Network interface device 224 connects to a two-way wide-area network (WAN) 226. According to one embodiment of the present invention, two-way WAN 226 is a switched telephone network (POTS or ISDN). ADSL, two-way cable technology, or other two-way network technology may also be utilized. Given the current infrastructure that is widely available for homes throughout the world, a point of presence node (POP) is necessary to connect the home to the packet-switched WAN. Thus, as illustrated in FIG. 2B, POP 206 connects the two-way WAN to a packet-switched WAN 230 such as a TCP/IP network (e.g. the Internet or a VPN) or an X.25 network. In the event that a packet-switched WAN 230 can be delivered directly to the home in the future, POP 206 will no longer be necessary. Finally, within reach of the packet-switched wide area network is at least one content server 210 containing network deliverable content potentially of interest to the user of client device 202.

Typically, the user of client device 202 decides that he or she is interested in certain content available on one or more content servers 210. The user connects his or her client device 202 to a WAN such as the Internet or a private on-line service such as AOL™. This is generally accomplished by client software executing on client device 202 dialing the phone number of POP 206, going through an authentication procedure to establish the validity of the user's on-line account, and then providing the user with an on-line navigation means. The on-line navigation means may be through a general-purpose Hyper-Text Markup Language (HTML) browser, such as Netscape Navigator™ or Microsoft™ Internet Explorer, or through a proprietary on-line browser such as the America On-Line™ (AOL) client software.

If the user is seeking a particular content item, there are various tools such as search engines and catalogs that the user can use to search for the content. Once that item is found, the user typically clicks the mouse or other input device on a hyperlink to that item. The hyperlink in turn directs the client software to initiate a download of the selected content into their client device 202. Depending on the data size of the content selected, the communications bandwidth, the network traffic, and the load on content server 210 holding the content, the download time may vary. The download may complete almost instantly or take minutes or hours. Upon completion of the download, the user may experience a visual result such as a picture or a video clip, or an auditory result such as music. Alternatively, the download may simply be a file that is stored in memory or on a disk for later use.

Although a download theoretically may complete very quickly, the typical experience of the home Internet or on-line service user is that downloads can often be very slow, even for relatively small data items. There are a number of factors that affect the time required to retrieve an item, but even if all of the stages of the download are working at optimum efficiency, the home user is typically still limited to the bandwidth limitations of the switched telephone network.

Although there are other experimental and proposed technologies to provide two-way high-bandwidth communications to the home beyond 128 Kbps, none of these technologies have been deployed to any significant degree on a nationwide or worldwide basis. For example, ADSL uses the telephone twisted pair going to the home from the telephone central office to provide over 1 Mbps of downstream (to the home) bandwidth and lower upstream bandwidth. The problem arises, however, due to the fact that ADSL requires the installation of ADSL modems in every telephone central office. This is clearly a monumental undertaking and is not a solution that can be implemented without a great deal of planning and cost. Further, network user demands for information can still exceed the bandwidth limitations of ADSL.

Overview of Invention

The present invention overcomes the limitations inherent in the prior art by utilizing a high-bandwidth broadcast channel (such a DBS, Cable TV, terrestrial broadcasts, and others) for downstream communications. Broadcast channels are generally available across a wide area and provide an extremely high bandwidth. As such, these broadcast channels overcome many of the limitations of POTS and ISDN.

Broadcast channels do suffer from certain other inherent limitations not shared by POTS and ISDN lines. For example, broadcast communications channels are one-way, with no means for retries if data is corrupted. Additionally, although they are very high-bandwidth channels, the channels are shared by millions of people. These broadcast channels are already heavily utilized for their current purposes. DBS bandwidth, for example, is almost completely utilized for transmitting video.

The present invention overcomes these limitations on broadcast channels by taking advantage of the fact that, 1) broadcast networks have peak and off-peak hours, and 2) various datasets can be variably modulated on the broadcast stream of a particular channel. During the hours between 11 PM and 7 AM in each time zone in the United States, for example, there tend to be fewer viewers watching broadcast television than during daytime or evening hours. In fact, many TV stations go off the air during some of these late hours. For example, many public TV stations are only on the air from dawn to late evening due to the fact that there is limited viewership during the early morning hours. This limited viewership during these hours does not justify the expense of broadcasting a signal, both in terms of electricity consumed and staff to man the station.

In addition to public TV channels, even commercial channels experience a reduced viewership during off-peak hours. Many of these channels have resorted to "selling" these off-peak time slots to various advertisers and producers of infomercials. Given the low viewership, however, these time slots do not generate a great deal of revenue. In short, prior art CATV broadcast systems do not effectively utilize off-peak hours channel time, and as a result this channel bandwidth is not being used to its full potential.

A) Off-peak Transmission of Data within a Video Signal

According to one embodiment of the present invention, these off-air channel times are utilized to broadcast data to home Internet users. According to this embodiment, a variety of data may be transmitted during off-peak hours. For example, users may be allowed to schedule software updates during these hours. While a user is logged in during the day, the user may be presented with the option of upgrading various software on his or her client machine. If the user selects the upgrade, the user may then be presented with the option of having the upgrade downloaded during off-peak hours, thus reducing the amount of time that the user is logged on to the network during peak hours. Off-peak downloading is also appreciated by the user, because the downloading happens transparently and without tying up the system during times when a user is most likely using the system. This is especially advantageous for large downloads that may require prolonged connectivity. It will be appreciated by one of ordinary skill in the art that other types of data may also be downloaded during these off-peak hours.

Figure 3A:
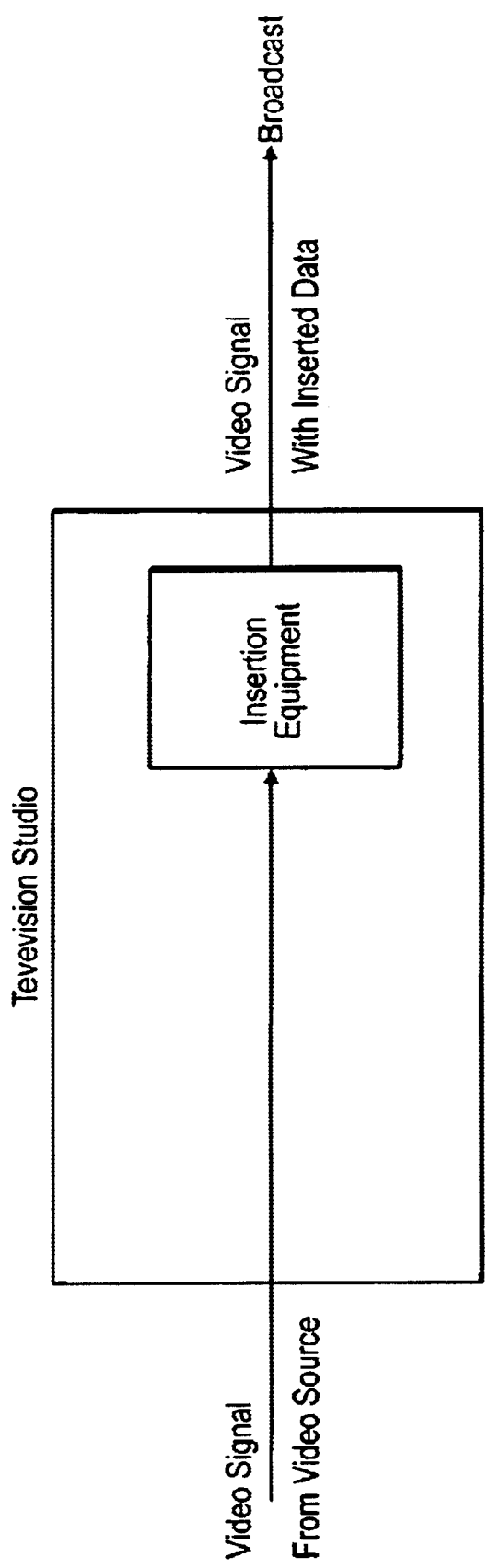
FIG. 3A illustrates a prior art method of inserting data into a video signal.

According to one embodiment, data is inserted into a video signal prior to transmission to a television studio. According to prior art methods of inserting data into a video signal, as illustrated in FIG. 3A, data is inserted by insertion equipment at a television studio, prior to a broadcast. This method of inserting data requires the originator of the data to have a relationship with the television studio performing the data insertion, and that the television studio be equipped with insertion equipment to perform the data insertion. These requirements severely limit the ability of a video signal originator to have data inserted into a video signal for transmission because the television studio has complete control of the insertion. Additionally, many studios may not have the ability to perform the data insertion and the cost of upgrading all studios with data insertion equipment is an expensive proposition.

Figure 3B:
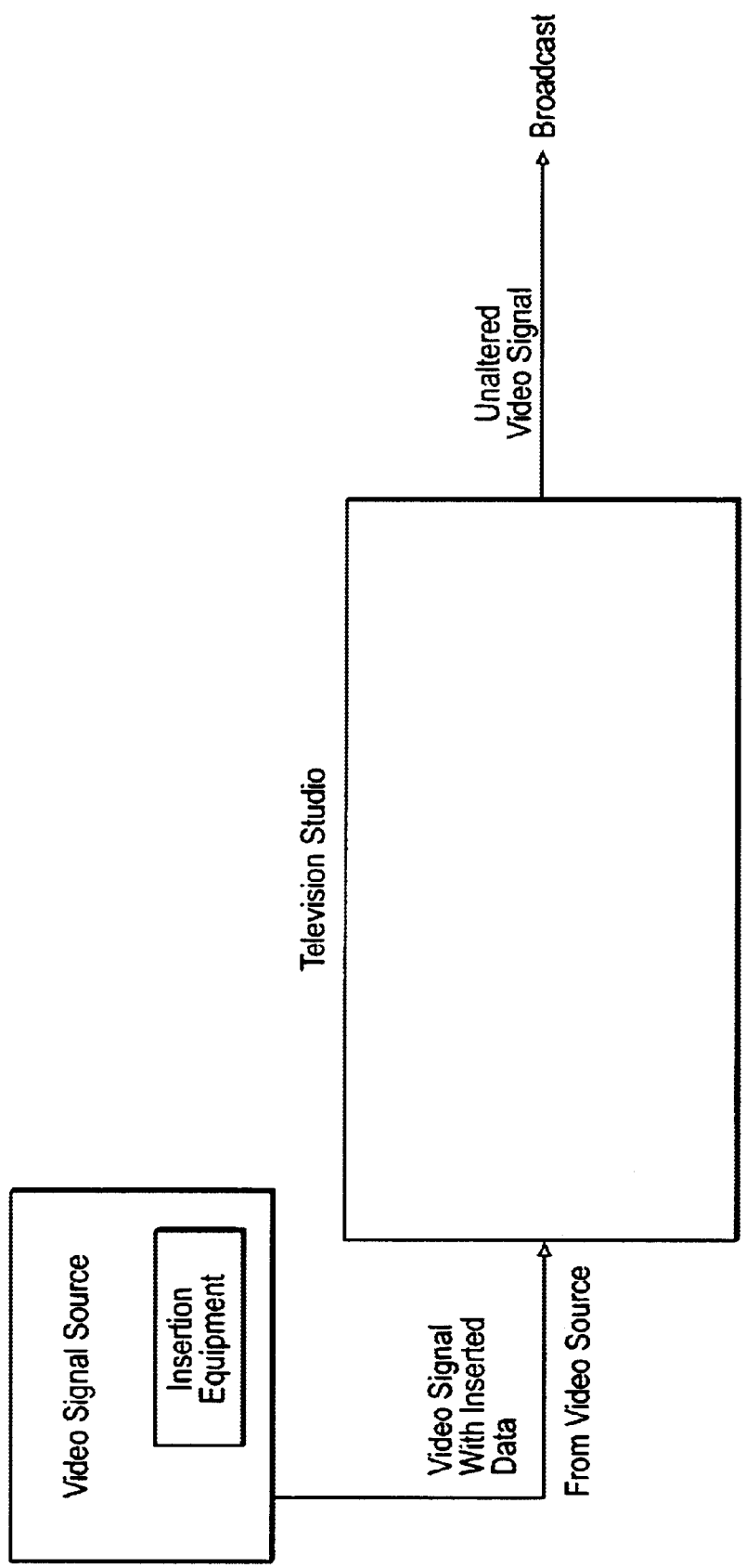
FIG. 3B illustrates inserting data into a video signal prior to transmitting the signal to a television studio.

Thus, according to one embodiment of the present invention, as illustrated in FIG. 3B, data is inserted into a video signal prior to transmitting the signal to a television studio. The originator of the video signal according to this embodiment thus has complete control over the insertion of the data into the video signal. The originator of the video does not have to create or maintain a special relationship with the television studio in order to insert data into its video signal. Additionally, television studios that have not been upgraded with data insertion equipment can still receive and transmit the video signal with the data already inserted. This represents a significant advantage to both parties because neither is limited by the capabilities of the other.

Furthermore, the United States Supreme Court recently published an opinion stating that cable broadcasters are required to carry infomercial signals transmitted by a UHF (Ultra High Frequency) carrier. This "must carry" requirement allows an infomercial signal originator to have complete access to broadcast an infomercial signal via all cable broadcast stations. This further eliminates any need for a video signal operator to establish a special relationship with the cable broadcaster or for the broadcasters to perform expensive equipment upgrades. Infomercials therefore represent a simple and inexpensive method of transmitting and receiving video signals with inserted data. Given the length of an average infomercial, a large amount of data may be inserted for tranmission with the infomercial signal at a low cost to the infomercial signal originator.

Figure 4A:
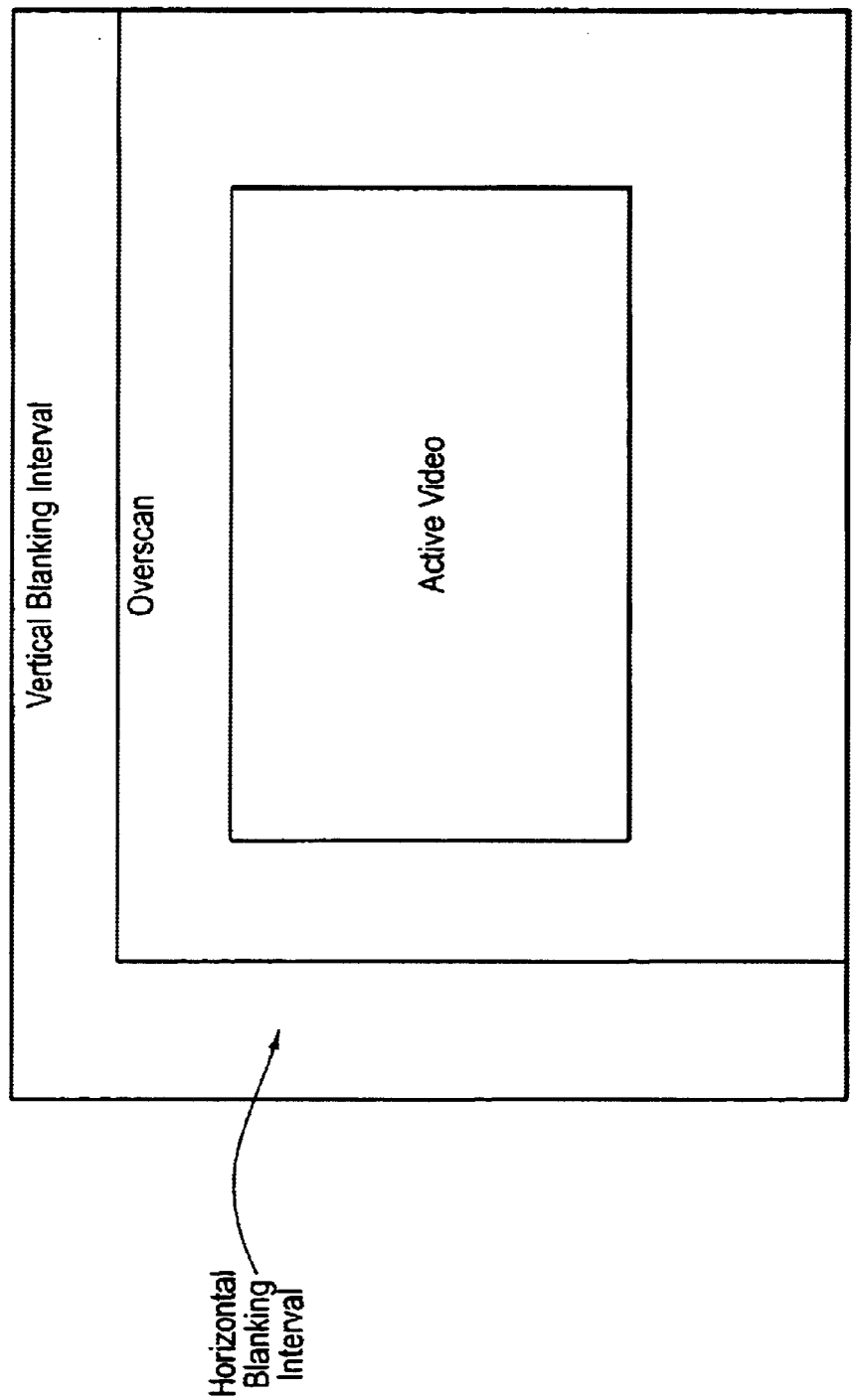
FIG. 4A illustrates the various areas on a television display screen.
Figure 4B:
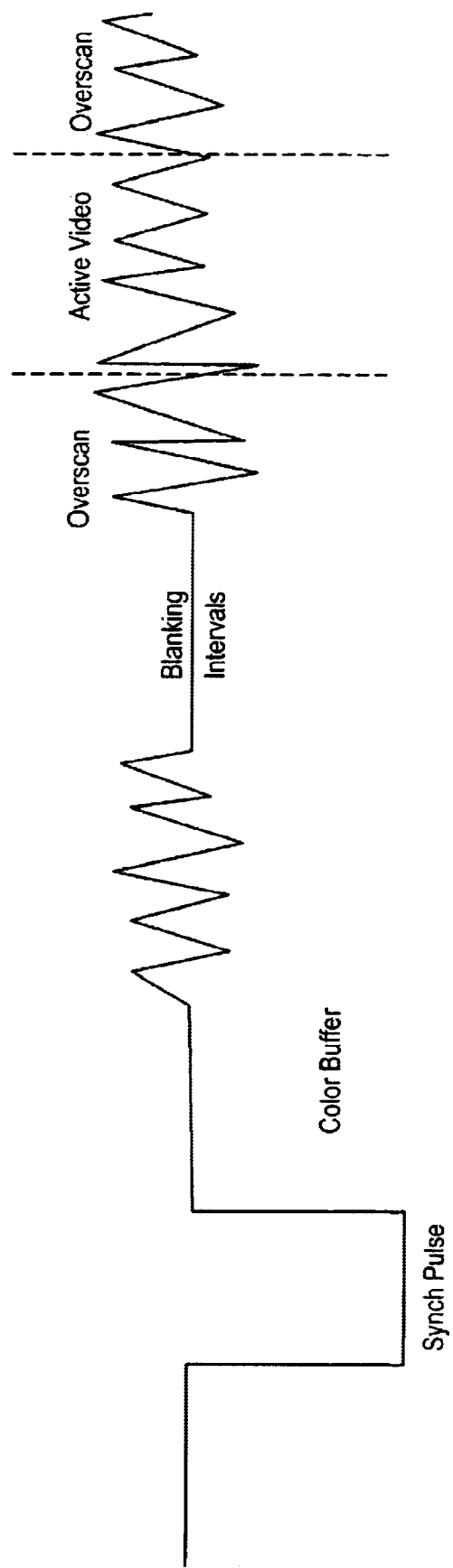
FIG. 4B illustrates a scan line of data in a television signal.

According to one embodiment of the present invention, the broadcast data is modulated within the standard parameters of a conventional television signal such as NTSC (National Television System Committee), Phase Alternation by Line (PAL) or Sequential and Memory (SECAM). FIG. 4A illustrates the various areas on a television display screen, including the area for the vertical blanking interval (VBI), the horizontal blanking interval (HBI), the overscan area and the active video portion. These areas are well known to those of ordinary skill in the art. FIG. 4B illustrates an example of a scan line of data in a television signal corresponding to the areas illustrated in FIG. 4A. As illustrated, the signal comprises a synch pulse, a blanking interval, an overscan portion and an active video portion. The active video portion is used to transmit a video image while the broadcast data modulation can be accomplished in a number of ways, including transmitting data during the vertical blanking interval or the horizontal blanking interval.

Additonally, the Federal Communications Commission (FCC) in the United States recently published an opinion allowing for the transmission of data during the overscan portion of a video signal. Prior to this opinion, the transmission of data in the video portion of broadcast signals (including the active video portion and the overscan portion) was generally prohibited, with limited authorized exceptions. Today, however, broadcast data may be transmitted during the VBI, the HBI or the overscan period. The advantage of transmitting data during the VBI, HBI or overscan period is that the active video bandwidth can continue to be used for transmitting video for presentation to a viewer. In this way, data transmitted during the VBI, HBI and overscan period does not displace normal video broadcast spectrum. If data is transmitted during the active portion of the video image, the broadcast might be more expensive since the broadcast may be competing for video spectrum.

In addition, conventional technology allows the transfer of data in the portion of the signal reserved for the closed captioning information. Although this area does not provide much space for data, this area can also be used for the transfer of data. The closed captioning portion is a fixed size region occurring at a fixed time/location in the broadcast signal. For this reason, the closed captioning portion does not provide any level of flexibility or bandwidth variability for the receiving client system.

Figure 5:
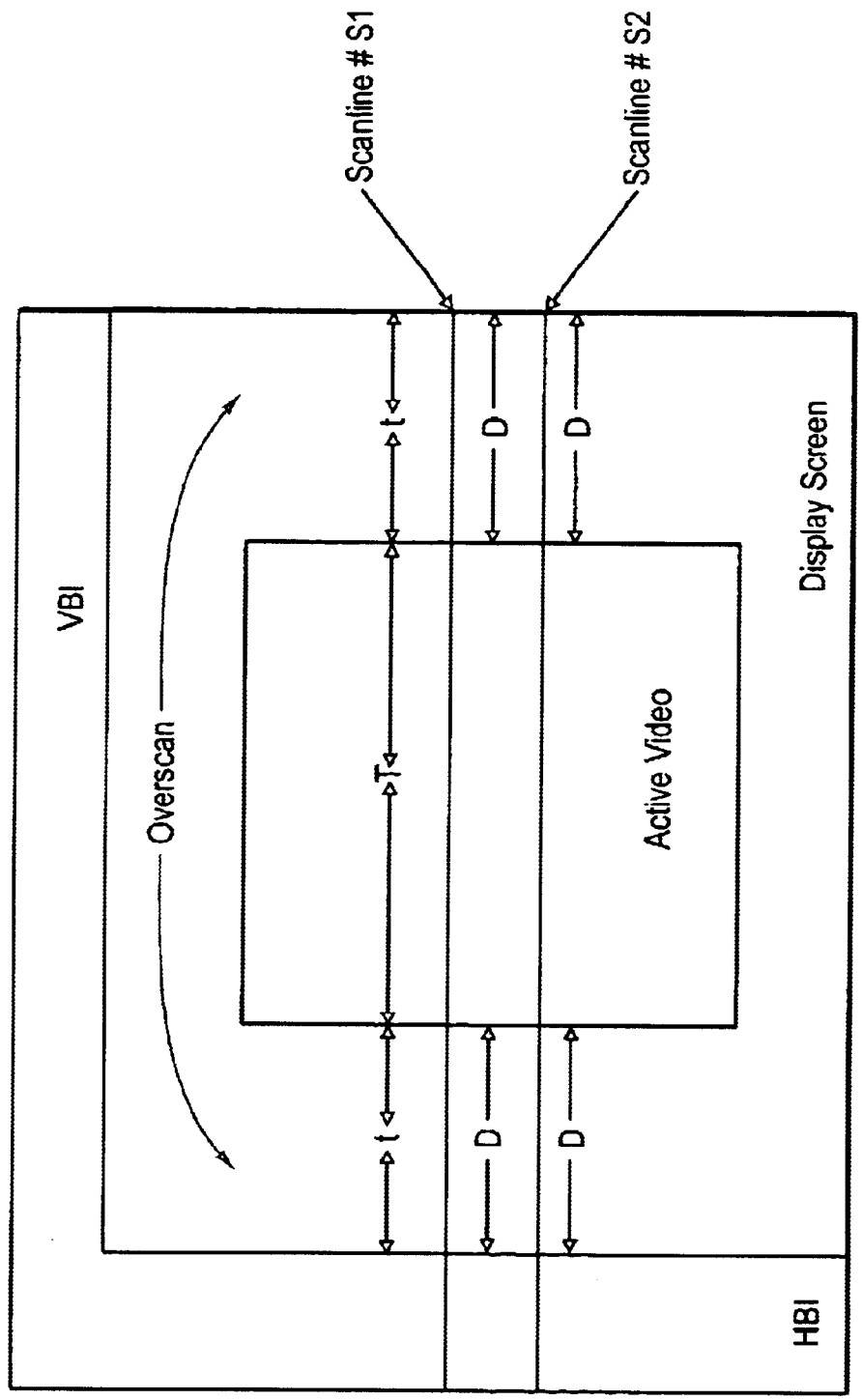
FIG. 5 illustrates the transmission of data during the overscan portion of a video signal.

FIG. 5 illustrates an embodiment of the present invention in which the overscan portion of the video signal is being utilized to broadcast the inserted data. The active video portion follows the overscan portion of the signal. Data is received during the overscan portion of the signal, and a demodulation unit begins to demodulate the inserted, interleaved data. During the active video portion of the signal, the demodulation unit experiences a latency. According to this embodiment, the demodulation unit is configured to take advantage of this latency period. The demodulation unit therefore does not need to be as fast as a demodulation unit that is demodulating a constant stream of data. Instead, the demodulation unit according to this embodiment only has to demodulate portion D during the active video signal in time T, while a prior art demodulation unit would have tried to demodulate portion D of the active signal within time t. The demodulation unit according to the present invention therefore can perform slower than prior art demodulation units, thus lowering the cost of the unit.

Additionally, in order to perform this type of a slow demodulation, according to one embodiment of the present invention, a "soft demodulator" or a software demodulator may be utilized instead of a hardware demodulation unit. Soft demodulators are less expensive to implement than hardware demodulators. Generally, however, soft demodulators are less efficient than their hardware counterparts and their rate of demodulation is limited by the characteristics of the computer, processor, availability, etc. upon which the demodulator is executed. If the system in FIG. 5 were to perform according to the prior art, the demodulation unit would be required to keep up with the incoming data stream, thus having to demodulate data D within time t. In order to do so, a soft demodulator implementation would be difficult to implement due to the high rate of the incoming data stream.

In contrast, however, according to an embodiment of the present invention, if the system of FIG. 5 demodulates data D during time T, then the rate of demodulation does not need to keep up with the incoming data stream. As such, given that the demodulation unit can demodulate at a reduced rate and still operate effectively, a soft demodulator implementation is utilized in this embodiment. This embodiment thus lowers the cost of the demodulation unit.

B) Improved Client Architecture

Even if data is being downloaded during off-peak hours as described above, demodulator technology will generally limit the rate at which the data is transmitted, received and demodulated. Although, in principle, data can be modulated through CATV systems in any format, in practice there are limitations on the effective use of many formats. When the digitized broadcast data is received in the home, the home device must be able to decipher the broadcast in order for the user to view the data. Although a 6 MHz CATV channel (the bandwidth normally allocated to an analog video channel) or a 6 MHz terrestrial broadcast channel can certainly carry a modulated digital data stream, the equipment at the CATV head-end or at the TV broadcast station is unlikely to be set up to carry a modulated digital signal. Moreover, in the case of a terrestrial broadcast, the national broadcast regulatory agency (the Federal Communications Commission (FCC) in the United States) may not approve a transmission within the allocated TV spectrum which does not meet the signal characteristics of a composite video signal.

Additionally, each CATV system is different. Most individual communities installed their CATV networks independently. Current CATV data transmission systems rely on head-end installations that are tailored for each individual CATV system, and frequently rely on extensive modifications of CATV systems. An example of one company that provides CATV-based high bandwidth Internet data delivery systems is @Home Inc. @Home Inc.'s technology utilizes extensive caching servers in the head-end as well as additional data distribution equipment in the nodes of the CATV system. These modifications are expensive, time-consuming, and are expected to place limitations on how quickly @Home Inc. will be able to expand into additional markets in the United States.

Other prior art CATV data transmission systems have been also extremely expensive. The Sega™ Channel, for example, utilizes a satellite uplink to distribute data nationwide through a downlink to various CATV systems. The data, which consists primarily of the object code of Sega video games, is demodulated at each head end and retransmitted as modulated digital data stream on an available channel on each CATV network. There is no caching store in the client device and as such, the data, is transmitted constantly, repeating every few minutes. A client device, installed in the home of a Sega Channel subscriber, waits until a particular video game requested by the Sega Channel subscriber is transmitted. The client device then downloads the video game onto the client device at the next scheduled download.

This architecture presents several limitations. There is a high cost associated with the modifications in the head end, and for the demodulation technology in the client device. Additionally, given that the Sega Channel architecture requires data to be transmitted constantly, a full CATV channel is utilized constantly, during both on- and off-peak hours. Data must also be repeated frequently because it is unacceptable for subscribers to have a long wait before a video game downloads. This results in an extremely inefficient use of the channel bandwidth. Finally, because the architecture is inherently one-way, there is no way for a client to upload any data or user feedback. Consequently, it is difficult to verify the effectiveness the data received during or after a download.

Another challenging aspect of current broadcast systems is that many CATV systems have changed ownership over time, and different owners have imposed various system changes, both in terms of technology and programming. As a result CATV systems are a collection of old and new technology, with a scattered allocation of channel spectrum.

Figure 6:
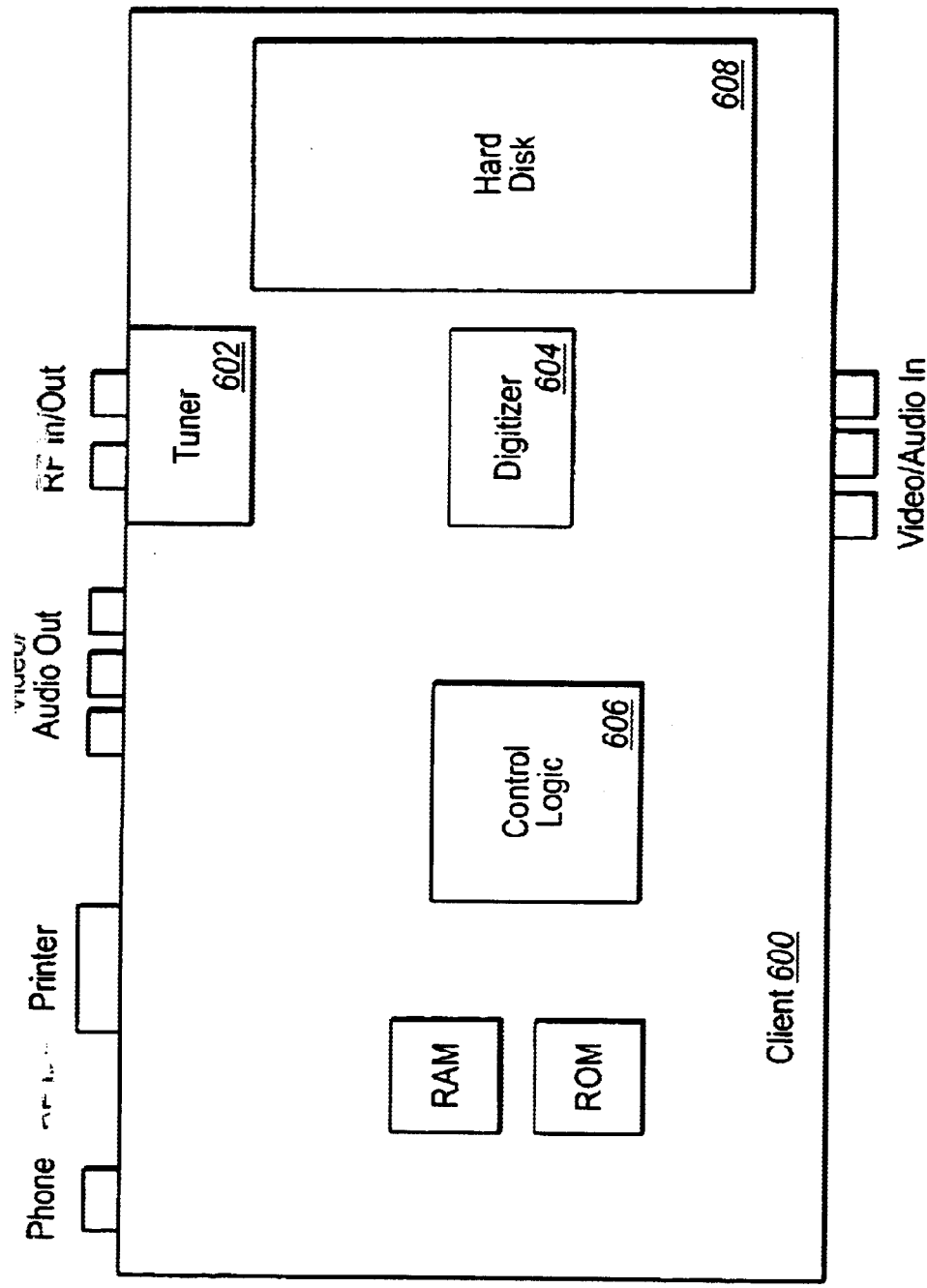
FIG. 6 illustrates an improved client architecture according to one embodiment of the present invention.

According to an embodiment of the present invention, the limitations of the prior art are overcome by utilizing an improved client architecture. The improved client architecture is illustrated in FIG. 6. As illustrated, the improved client 600 architecture includes tuner 602, digitizer 604 and control logic 606. Improved client 600 may also include hard disk 608.

According to one embodiment, control logic. 606 is an Application Specific Integrated Circuit (ASIC). The ASIC 606 is utilized to implement the improved modem architecture described below. According to another embodiment of the present invention, a digital camera may be coupled to client 600, thus allowing live digitized video clips to be displayed by a display device coupled to client 600. The live digitized video clip may be processed according to the compression method described below or any other suitable compression method.

Improved Demodulator Architecture

Prior art demodulators generally demodulate data as the data is received. This has resulted in the data transmission being limited by the speed of the demodulator. According to one embodiment of the present invention, an improved demodulator architecture is utilized. The improved demodulator architecture requires modifications to both the modulation as well as the demodulation aspects of the data broadcasts on the broadcast channels. Each of these modifications is described in detail below.

There are many methods in the prior art for subdividing a broadcast channel into separate sub-channels of information. Most transmissions systems utilize radio frequency (RF) carriers upon which one of many well-known digital modulation schemes such as 64 QAM (Quadrature Amplitude Modulation) or QPSK (Quadrature Phase Shift Keying) is applied, resulting in what is effectively a digital broadcast channel. Many satellite and CATV systems, for example, transmit digital data in this manner.

Figure 7A:
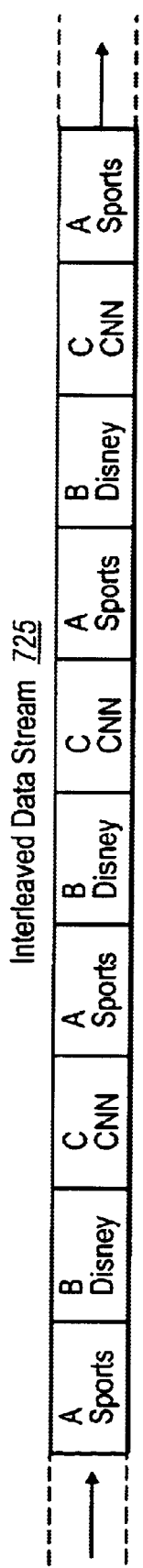
FIG. 7A illustrates an example of interleaved data.

Once a digital stream is being transmitted, techniques can be utilized to share the same channel among many sub-channels. For example, if there are 3 sub-channels, A, B, and C sharing the same channel, data packets might be interleaved from each of the channels sequentially as ABCABCABC, or if A had more data than B or C, the data packets might be interleaved as ABACABACABAC, for example. As will be appreciated by one of ordinary skill in the art, there are many possible data packet interleaving schemes that can be utilized effectively to divide a digital channel into several sub-channels. For purposes of this discussion, an example of some interleaved data is illustrated in FIG. 7A.

Figure 7B:
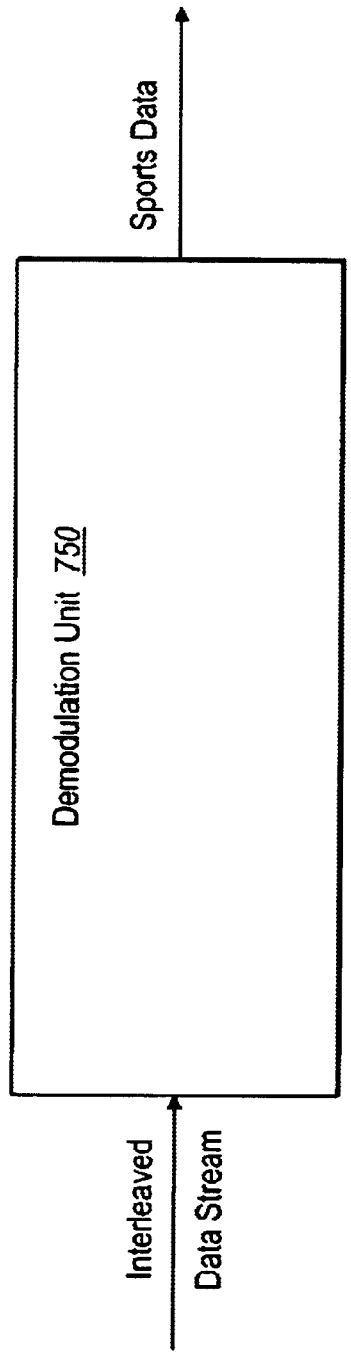
FIG. 7B illustrates an example of a demodulation unit configured to receive only Sports data.

According to one embodiment, the transmission of data over the broadcast channel is modified to include interleaved data. The interleaved data may include multiple types of data on different channels. Thus, for example, in the ABCAB-CABC interleaving technique illustrated in FIG. 7A, subchannel A may be Sports data, subchannel B may be Disney data and subchannel C may be CNN. A particular user may only be interested in Sports data, for example. Thus, according to the invention, this particular user's demodulation unit may be configured to receive only Sports data, as illustrated in FIG. 7B.

A signal indicates the beginning of different types of data. This signal may include a marker or may be implicitly derived from a predetermined time interval, e.g. a different type of data is interleaved at 5 second intervals. In either case, the demodulation unit is configured to demodulate the data at an appropriate pace based on the signals for the data. As will be appreciated from this discussion, using the invention, the demodulation unit does not necessarily have to demodulate the entire stream of data. Instead, during the time period between the starting and ending points of unwanted data, the demodulation unit does not have to demodulate any data. As such, in the sports only example, the demodulation unit may demodulate Sports information for the entire period T before encountering more Sports information in the interleaved data.

By virtue of this demodulation technique, the appropriate demodulation rate can be applied for a particular client having a particular throughput capacity. For example, if a client is configured with expensive hardware and can handle the demodulation of sub-channels within the time constraints defined above, the expensive client can provide a greater number of sub-channels for the user. Alternatively, the client can reduce the number of sub-channels it demodulates to reserve processing resources for other tasks. Thus, the client can be configured to demodulate the broadcast stream at a variable rate depending on the processing resources allocated to the demodulation process. In another example, a client may be minimally configured to be less expensive. In this case, the inexpensive client will not be able to demodulate all of the sub-channels. However, the inexpensive client will still be able to demodulate some portion of the broadcast stream without being overrun by the quantity of data. In this manner, according to the present invention, client of varying computing capacities can still take advantage of the broadcast stream.

Compressing Live Video Clips

As described above, according to one embodiment of the present invention, live video clips may be digitized and displayed on a display device coupled to improved client 600. The live video clips may also be compressed and transmitted over the network. According to this embodiment, when a video clip is digitized, a simple compression is performed on the data, and the minimally compressed data is stored on a hard disk such as hard disk 608 on improved client 600. When the user of client 600 decides to send out the video clip over the network, the user is advised that the clip has been sent. The user is not aware that the data has in fact not yet been sent. Instead, after the user is informed that the data has been sent, the minimally compressed data on hard disk 608 is retrieved and a thorough compression is then performed prior to the data being transmitted. This thorough compression may be performed by any standard compression technique such as MPEG-2. As may be appreciated by one of ordinary skill in the art, a thorough compression may take a prolonged period of time. According to this embodiment, however, the user is unaware of this lag time between the command to send the clip and the actual sending of the clip. The user instead experiences a seemingly instantaneous response to the request to send the live video clip.

Figure 8A:
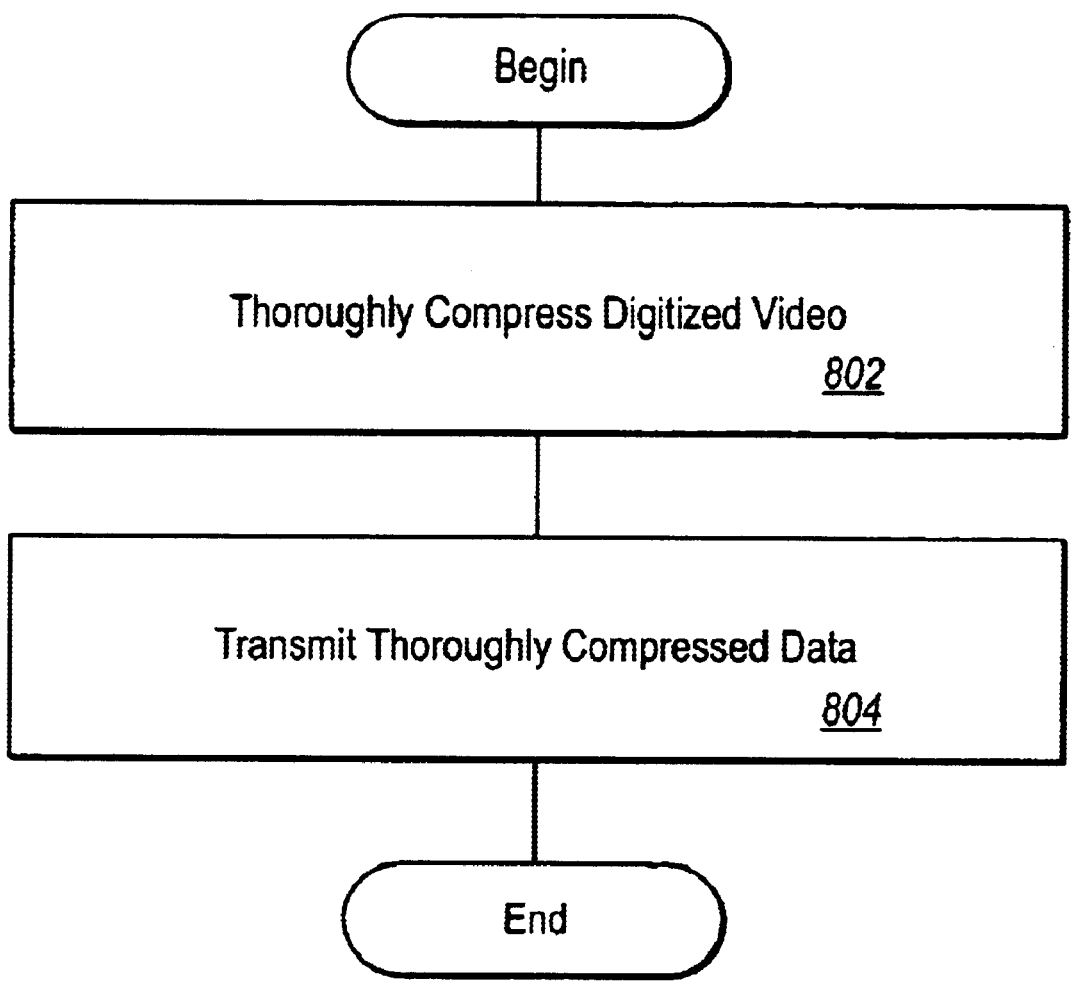
FIGS. 8A is a flow chart illustrating a prior art method of compressing video clips.
Figure 8B:
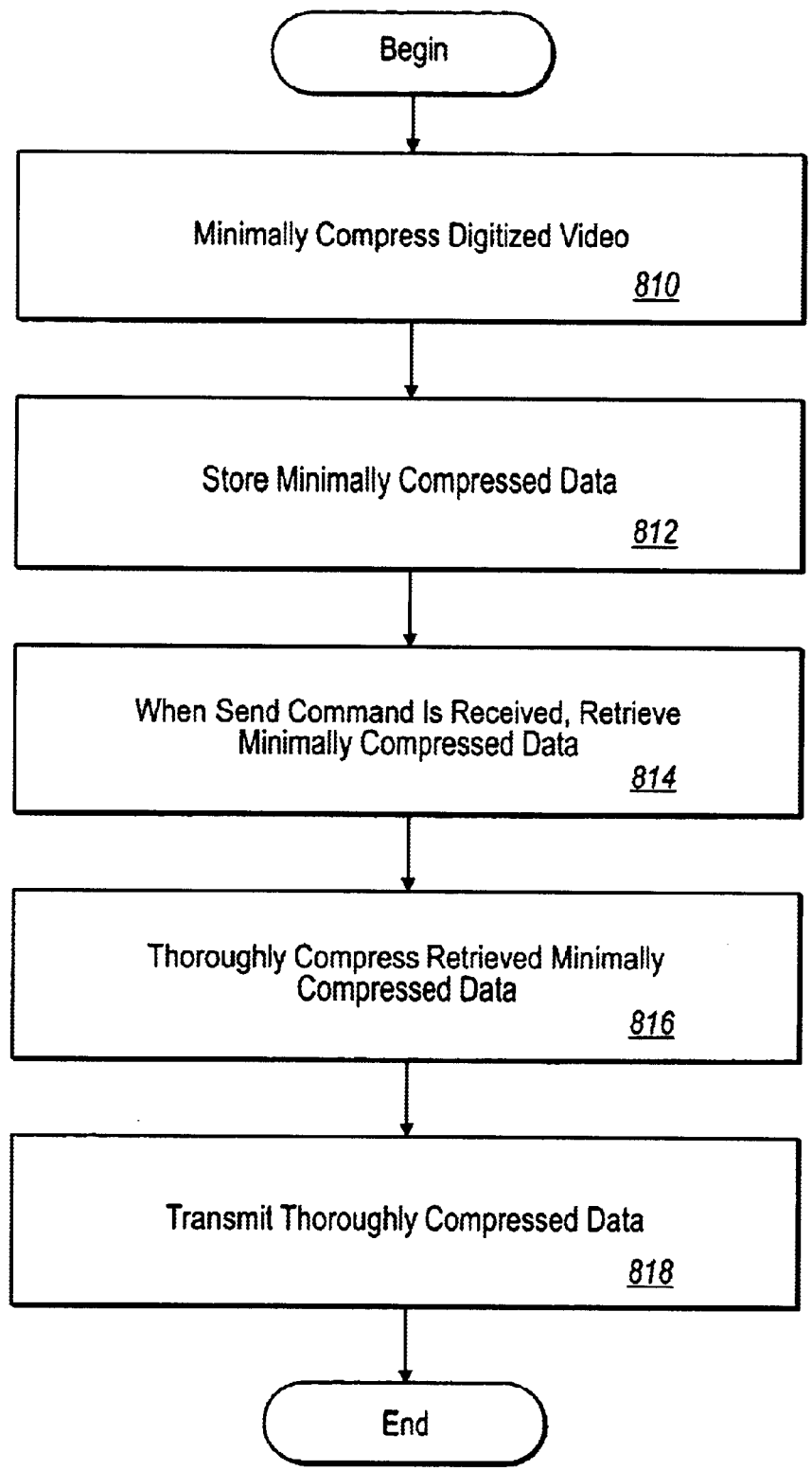
FIG. 8B is a flow chart illustrating an embodiment for compressing video clips of the presently claimed invention.

FIG. 8A is a flow chart illustrating a prior art method of compressing video clips while FIG. 8B illustrates an embodiment of the presently claimed invention. According to the prior art method, a digitized video clip is thoroughly compressed in step 802 and transmitted in step 804. According to an embodiment of the presently claimed invention, however, a digitized video clip is minimally compressed in step 810. The minimally compressed video clip is stored in a storage media, such as a hard disk, in step 812. When a send command is received, the stored minimally compressed video clip is retrieved in step 814. The minimally compressed video clip is then thoroughly compressed in step 816, and finally in step 818, the thoroughly compressed video clip is transmitted. The invention can effectively transfer data at lower compression levels by the above-described technique of selecting the data to transmit based on user delivered preferences.

Thus, a method and apparatus for utilizing a high bandwidth communications channel for broadcasting network data during off-peak hours is disclosed. The specific arrangements and methods described herein are merely illustrative of the principles of the present invention. Numerous modifications in form and detail may be made by those of ordinary skill in the art without departing from the scope of the present invention. Although this invention has been shown in relation to a particular preferred embodiment, it should not be considered so limited. Rather, the present invention is limited only by the scope of the appended claims.

What is claimed is:

1. In a computer network, which includes a plurality of interconnected content servers and at least one client device connected to one or more high-bandwidth broadcast channels transmitting content in a one-way downstream direction, wherein the at least one client device includes a demodulation unit with a particular throughput capacity and is connected to the computer network over a relatively lower bandwidth two-way communication channel, a method of delivering requested content, stored at one or more of the plurality of content servers, to the at least one client device over a high-bandwidth broadcast channel, the method comprising acts of:

identifying available downstream bandwidth within a particular broadcast channel, wherein the downstream bandwidth is available during off-peak broadcast hours, and wherein the available bandwidth includes either (i) at least one available portion or sub-channel of a broadcast channel containing active video transmitted to a viewer, (ii) at least one available portion or sub-channel of a broadcast channel that does not contain active video, or (iii) an unused broadcast channel;

preparing the requested content for transmission in a modulated form to the at least one client device by interleaving the requested content with other content into a selected portion of the available bandwidth at a rate that is compatible with the particular throughput capacity of the demodulation unit of the at least one client device; and transmitting the requested content in its modulated form over the particular broadcast channel to the at least one client device following a request for the content and during off-peak broadcast hours so that the demodulation unit is able to demodulate the requested content during latencies created by the interleaving of the requested content.

2. A method as recited in claim 1, wherein the content requested by the at least one client device is requested during peak broadcast hours, the method further comprising an act of scheduling the transmission of the requested content for off-peak broadcast hours when downstream broadcast bandwidth is available.

3. A method as recited in claim 1, wherein the downstream bandwidth is available only during off-peak broadcast hours.

4. A method as recited in claim 1, wherein the requested content is Internet content.

5. A method as recited in claim 1, wherein an entity other than a broadcaster modulates the requested content into the available downstream bandwidth.

6. In a computer network, which includes a plurality of interconnected content servers and at least one client device connected to one or more high-bandwidth broadcast channels transmitting content in a one-way downstream direction, a method of delivering content to the at least one client device over a high-bandwidth broadcast channel, the at least one client device including a demodulation unit with a particular throughput capacity, and the method comprising acts of:

identifying available downstream bandwidth within a particular broadcast channel, wherein the available bandwidth includes either (i) at least one available portion or sub-channel of a broadcast channel containing active video transmitted to a viewer, (ii) at least one available portion or sub-channel of a broadcast channel that does not contain active video, or (iii) an unused broadcast channel;

selecting a portion of the available downstream bandwidth and using that selected portion to prepare the content that is to be delivered for transmission to the at least one client device, and preparing it in a modulated form by interleaving the content that is to be delivered with other content into the selected portion of the available bandwidth at a rate that is compatible with the particular throughput capacity of the demodulation unit of the at least one client device; and transmitting the content that is to be delivered in its modulated form over the particular broadcast channel to the at least one client device so that the demodulation unit is able to demodulate the delivered content during latencies created by the interleaving of the content that is to be delivered with the other content.

7. A method as recited in claim 6, wherein the available downstream bandwidth within a particular broadcast channel comprises an overscan portion.

8. A method as recited in claim 6, wherein only content specifically requested by the at least one client device is modulated into the available downstream bandwidth, thereby permitting the available bandwidth to be shared among a plurality of client devices that request different content.

9. A method as recited in claim 1, wherein the content comprises a software upgrade.

10. A method as recited in claim 9, further comprising the act of receiving a request from the at least one client device for upgrading software of the at least one client device, the request having been made during peak hours and specifying that a user of the at least one client device has selected an option of having the software upgrade downloaded during off-peak hours.

11. A method as recited in claim 6, wherein the content comprises a software upgrade.

12. A method as recited in claim 11, further comprising the act of receiving a request from the at least one client device for upgrading software of the at least one client device, the request having been made during peak hours and specifying that a user of the at least one client device has selected an option of having the software upgrade downloaded during off-peak hours.

13. In a client included in a computer network that has a broadcast channel for transmitting data downstream from a server to the client that includes a demodulation unit with a particular throughput capacity, the broadcast channel also having a video portion for transmitting video, a computer program product comprising a computer readable medium carrying executable instructions for implementing a method of demodulating requested data that has been modulated on the broadcast channel, and wherein the method is comprised of the acts of:

receiving on a portion of the broadcast channel the requested data in a modulated form that has been prepared by interleaving the requested data with the video portions into the selected portion of the broadcast channel at a rate that is compatible with the particular throughput capacity of the demodulation unit of the client;

using the demodulation unit of the client, during a first time interval initiating demodulation of the portion of the broadcast channel that contains the requested data in its modulated form in order to obtain the requested data; and completing the demodulation during a subsequent second time interval that results from latencies created by the interleaving of the requested data with the video portion.

14. A computer program product for implementing the method as recited in claim 13, wherein the requested data comprises a software upgrade.

15. A computer program product for implementing the method as recited in claim 14, further comprising the act of making a request for the software upgrade, the request being made during peak hours and specifying that a user of the client has selected an option of having the software upgrade downloaded to the client during off-peak hours.

16. A computer program product for implementing the method as recited in claim 13, wherein the selected portion is included in an overscan portion of the broadcast channel.

17. A computer program product for implementing the method as recited in claim 13, wherein the data is requested by the client and is interleaved into the data portion along with other data requested by other clients, thereby permitting the available bandwidth of the data portion to be shared among a plurality of clients that request different data.

18. In a client included in a computer network that has a broadcast channel for transmitting data downstream from a server to the client, and wherein the client includes a demodulation unit with a particular throughput capacity, a computer program product comprising a computer readable medium carrying executable instructions for implementing a method of demodulating requested data that has been modulated on the broadcast channel, and wherein the method is comprised of the acts of:

receiving on a portion of the broadcast channel the requested data in a modulated form that has been prepared by interleaving the requested data in data packets with other data packets into the selected portion of the broadcast channel at a rate that is compatible with the particular throughput capacity of the demodulation unit of the client; and as a sequence of the interleaved data packets are received by the client, iteratively performing the acts of:
receiving a data packet that represents a portion of the requested data;
during a first time interval, initiating demodulation of the data packet using the client's demodulation unit in order to obtain a portion of the requested data; and
completing the demodulation during a subsequent second time interval that results from latencies created by the interleaving of the data packets for the requested data with the other data packets.

19. A computer program product for implementing the method as recited in claim 18, wherein the requested data is included in data packet in an overscan portion of the broadcast channel.

20. A computer program product for implementing the method as recited in claim 18, wherein the data is requested by the client and is interleaved into a data portion of the broadcast channel along with other data requested by other clients, thereby permitting the available bandwidth of the data portion to be shared among a plurality of clients that request different data.

21. In a server included in a computer network that has a broadcast channel for transmitting data downstream from the server to a client, a method of interleaving onto the broadcast channel data packets representing the data at a rate compatible with a demodulation unit of the client, comprising the acts of:

receiving from the client a request for data, wherein the client includes a demodulation unit with a particular throughput capacity;

obtaining first data packets representing the data;

interleaving the first data packets onto the broadcast channel along with second data packets representing other data, the first data packets being interleaved at a rate that is selected based on the particular throughput capacity of the demodulation unit, wherein:

the rate is sufficiently low that the demodulation unit is capable of demodulating a particular first data packet during a time period between successive first data packets; and the throughput capacity of the demodulation unit is such that the demodulation unit is not capable of demodulating the particular first data packet during a time period between the starting point and the ending point of a first data packet; and transmitting the interleaved first data packets to the client on the broadcast channel.

22. A method as recited in claim 21, further comprising the acts of:

receiving a request for different data from another client, wherein said other client includes a demodulation unit with a throughput capacity that is different from the particular throughput capacity of the client; and obtaining the second data packets, wherein the second data packets represent the different data requested by said other client, and wherein the second data packets are interleaved onto the broadcast channel at an interleaving rate that is selected based on the throughput capacity of said other client.

23. A method as recited in claim 21, wherein the first data packets and the second data packets are interleaved onto an overscan portion of the broadcast channel.

24. A method as recited in claim 21, wherein the data comprises a software upgrade requested by the client.

25. A method as recited in claim 24, further comprising the act of receiving a request for the software upgrade, the request having been made during peak hours and specifying that a user of the client has selected an option of having the software upgrade downloaded to the client during off-peak hours.

26. A method as recited in claim 21, wherein the data is requested by the client.

27. A computer program product for implementing the method as recited in claim 18, wherein the data requested by the at least one client device is requested during peak broadcast hours, the method further comprising an act of scheduling the transmission of the requested data for off-peak broadcast hours.

28. A computer program product for implementing the method as recited in claim 27, wherein the broadcast channel includes downstream bandwidth that is available only during off-peak broadcast hours.

29. A computer program product for implementing the method as recited in claim 18, wherein the requested content is Internet content.

30. A computer program product for implementing the method as recited in claim 18, wherein an entity other than a broadcaster modulates the requested data into the selected portion of the broadcast channel.

31. A computer program product for implementing the method as recited in claim 28, wherein the available downstream bandwidth within a particular broadcast channel comprises an overscan portion.

32. A computer program product for implementing the method as recited in claim 28, wherein only data specifically requested by the client is modulated into the available downstream bandwidth, thereby permitting the available downstream bandwidth to be shared among a plurality of clients that request different content.

33. A computer program product for implementing the method as recited in claim 18, wherein the requested data comprises a software upgrade.

34. A computer program product for implementing the method as recited in claim 33, wherein the client makes the request for the software upgrade during peak hours, and further requests that the software upgrade be downloaded during off-peak hours.

35. In a client included in a computer network that has a broadcast channel for transmitting data downstream from a server to the client, and wherein the client includes a demodulation unit with a particular throughput capacity, a method of demodulating requested data that has been modulated on the broadcast channel, comprising the acts of:

receiving on a portion of the broadcast channel the requested data in a modulated form that has been prepared by interleaving the requested data in data packets with other data packets into the selected portion of the broadcast channel at a rate that is compatible with the particular throughput capacity of the demodulation unit of the client; and as a sequence of the interleaved data packets are received by the client, iteratively performing the acts of:

receiving a data packet that represents a portion of the requested data;

during a first time interval, initiating demodulation of the data packet using the client's demodulation unit in order to obtain a portion of the requested data; and completing the demodulation during a subsequent second time interval that results from latencies created by the interleaving of the data packets for the requested data with the other data packets.

* * * * *